United States Patent
Kataria et al.

(10) Patent No.: US 11,235,934 B2
(45) Date of Patent: Feb. 1, 2022

(54) SMART MONITORING OF BELT TENSION AND SLIP

(71) Applicants: Devika Kataria, Jaipur (IN); Prakash CRJ Naidu, Ottawa (CA); Rohit Goyal, Ludhiana (IN); Venkateswaran Sundar, Chennai (IN)

(72) Inventors: Devika Kataria, Jaipur (IN); Prakash CRJ Naidu, Ottawa (CA); Rohit Goyal, Ludhiana (IN); Venkateswaran Sundar, Chennai (IN)

( * ) Notice: Subject to any disclaimer, the term of this patent is extended or adjusted under 35 U.S.C. 154(b) by 0 days.

(21) Appl. No.: 17/026,170

(22) Filed: Sep. 19, 2020

(65) Prior Publication Data
US 2021/0101753 A1    Apr. 8, 2021

(51) Int. Cl.
*B65G 43/04* (2006.01)
*B65G 23/44* (2006.01)

(52) U.S. Cl.
CPC ........... *B65G 43/04* (2013.01); *B65G 23/44* (2013.01); *B65G 2203/0266* (2013.01); *B65G 2203/042* (2013.01); *B65G 2203/047* (2013.01)

(58) Field of Classification Search
CPC ........ B65G 43/02; B65G 43/06; B65G 43/04; B65G 23/44; B65G 2203/042; B65G 2203/047; B65G 2203/0266
USPC .......................... 198/810.02, 810.03, 810.04
See application file for complete search history.

(56) References Cited

U.S. PATENT DOCUMENTS

| | | | | |
|---|---|---|---|---|
| 4,928,538 A | * | 5/1990 | Burdess | G01L 5/042 73/862.41 |
| 5,019,017 A | * | 5/1991 | Monch | F16H 61/6624 474/102 |
| 7,427,767 B2 | * | 9/2008 | Kemp | B65G 43/02 198/502.1 |
| 8,387,777 B2 | * | 3/2013 | Tokhtuev | G01L 5/101 198/502.1 |
| 2009/0303065 A1 | * | 12/2009 | Lipowski | B65G 43/02 340/679 |
| 2015/0008097 A1 | * | 1/2015 | Andreoli | B65G 43/02 198/502.4 |

\* cited by examiner

*Primary Examiner* — James R Bidwell

(57) ABSTRACT

A method and apparatus for monitoring tension and detecting slip of industrial belts while in running condition on belt drive system by using ultrasonic transducers. The sensing part involves two ultrasonic transducers which are installed on an assembly which is placed within a constrained space between the tension side and slack side of belt. Sinusoidal waves having predefined amplitude are sent from transmitting transducer on the belt and amplitude of the signal reflected from the belt is measured and compared with a threshold value to detect reduced tension. An acoustic sleeve is mounted on driving and driven pulley locknuts to blank the reflected signal periodically to measure the speeds of the pulleys compared to detect the slip of the belt. The apparatus generates an alert to user when the belt tension is reduced and/or when slip is detected. The processing circuit involves microcontroller with Wi-Fi module to send alert messages.

17 Claims, 7 Drawing Sheets

SMART MONITORING OF BELT TENSION AND SLIP

STATEMENT REGARDING FEDERALLY SPONSORED RESEARCH OR DEVELOPMENT

The work on which the disclosure of this application is based is not funded by any Federally Sponsored Research or Development in the United States of America.

FIELD OF THE INVENTION

The present invention is directed to drives that use flexible means such as belts to transmit motion and torque from one driver rotating member to another rotating member, requiring monitoring of tension and slip.

DESCRIPTION OF THE RELATED ART

There have been some disclosures reported in the prior art to develop belt tension monitoring system by deploying sensors on industrial belts.

A disclosure by Michael L. King, (U.S. Pat. No. 8,328,005 B2 dated Dec. 11, 2012) described verifying of belt tension on a conveyor mechanism in which belt is mounted under tension on rollers and selected physical status parameters are measured and determined if the belt has reached a predetermined level from such status parameters without direct monitoring of belt tension using pressure transducer.

Serkh et. al. (U.S. Pat. No. 6,834,228 B2 dated Dec. 21, 2004) described a belt drive system with automatic belt tension control for engines. The system has an actuator operated on a pivoted wheel and controlled by a control module. The control module processes the signals which are detected by a series of sensors and instructs the actuator to move the pivoted wheel to change belt tension. A feedback loop from the sensors to the control module monitored belt tension continuously and adjusted many times per second.

Monch et. al. (U.S. Pat. No. 5,019,017 dated May 28, 1991) described method by two sensing members placed in equal and opposite direction for sensing the markings on the drive belt and sensing members output corresponding sensing signals in response to the markings.

Lipowski et. al. (Patent US 2009/0303065 A1 dated Dec. 10, 2009) used capacitor array with sensing elements used to sense the dynamic capacitance change coupled with electrocapacitive and piezoelectric effects exhibited by the belt to detect damages in belt structure.

Burdess et. al. (U.S. Pat. No. 4,928,538 dated May 29, 1990) defined monitoring of tension by measuring natural frequency of vibration of the belts in different arrangements.

Prucka et. al. (Patent US20120158226A1 dated Jun. 21, 2012) determined slip of belt of a vehicle by comparing a speed of the motor to a speed of the engine with the help of a controller.

Kees et. al. (U.S. Pat. No. 7,573,219B2 dated Aug. 11, 2009) demonstrated detection of belt slip between an electric machine and a machine drivingly connected by a drive belt by measuring rotor speed, voltage and current derived from the electric machine.

Embodiments and aspects of the present invention overcome some of the difficulties in prior art either separately, individually or in combination with each other. The advantage of the present invention will become apparent from the description and accompanying drawings.

BRIEF SUMMARY OF THE INVENTION

This invention relates to sensing of belt tension and slip for Industrial belts (Timing, V, flat or other shapes of belts for conveyor, and other transmission or drive applications of a belt) and sending alarm for maintenance if parameters are out of range. The monitoring of tension and slip may be done while the belt is in running condition. According to one aspect of the invention, regular determination of belt slip by the same device that measures the belt tension enables timely corrective action resulting in reduced noise from the system, extends the belt life, and reduces energy losses in the form of heat. Further, and in addition, some aspects of the invention are applicable to involvement of transducers which may be mounted on outer-side or inner side of the belt drive in relatively compact space around the belt. According to yet another optional but additional aspect of the invention, the same set of transducers and electronic circuit are used for sensing the tension and slip. According to a preferred embodiment of the invention, it provides sensing the tension of belt by non-contact method while the same apparatus can be used to monitor the belt tension as well as slip. Moreover, the system can monitor the tension and slip simultaneously while the belt is moving without the need to stop the system to take measurements. In summary, the disclosed invention of belt tension monitoring system offers considerable improvement and advantages over those described in prior art.

Belt tension is monitored using a pair of ultrasonic transducers which act as transmitter and receiver which have been held at a fixed distance on the top or underside of timing belt. The microcontroller and ultrasonic signal generator send a continuous sine waveform at ultrasonic frequency to the transmitting transducer. The electrical signal is converted into sound waves that interact with the surface of belt mounted on a drive system. The amplitude of signal transmitted is fixed and the reflected signal from the belt is captured by the receiver transducer which converts the sound wave into electrical signal. The received signal amplitude is compared with a pre-decided threshold value which is stored in the microcontroller. As the belt tension changes, the amplitude of sine wave received at the receiver transducer also changes. In case the amplitude of received signal is found to be changed below a specified threshold value then an alert message is sent to a remote location that has a cloud platform and/or has a user interface device such as a computer or a mobile phone or a tablet with display to store, retrieve, and view a warning message by personnel such as maintenance engineer using an Internet of Things (IoT) based service so that the belt can be replaced in a timely manner.

The invention also monitors the slip of the belt using the same set of transducers and the electronic circuit. The rate of revolution (revolutions per minute: rpm) of the driver and driven pulley are monitored and compared. The rotational speed of the driver and driven pulleys are computed and compared. If the rotational speeds of the driver and driven pulleys are comparable with respect to the theoretical speeds inversely proportional to the diameters of the pulleys then there is no slip in the belt, else an alarm is actuated and alert generated for replacement of the belt.

This invention involves non-contact method and can be used for both Timing and V belts. The invention has an embodiment where transducers can be mounted in space between the tension and slack sides of belt, thus optimum space utilization is done.

The invention involves monitoring of slip between the belt and the drive system that helps to achieve power transmission efficiency by timely replacing of the belt.

DETAILED DESCRIPTION OF THE INVENTION

Figure 1:
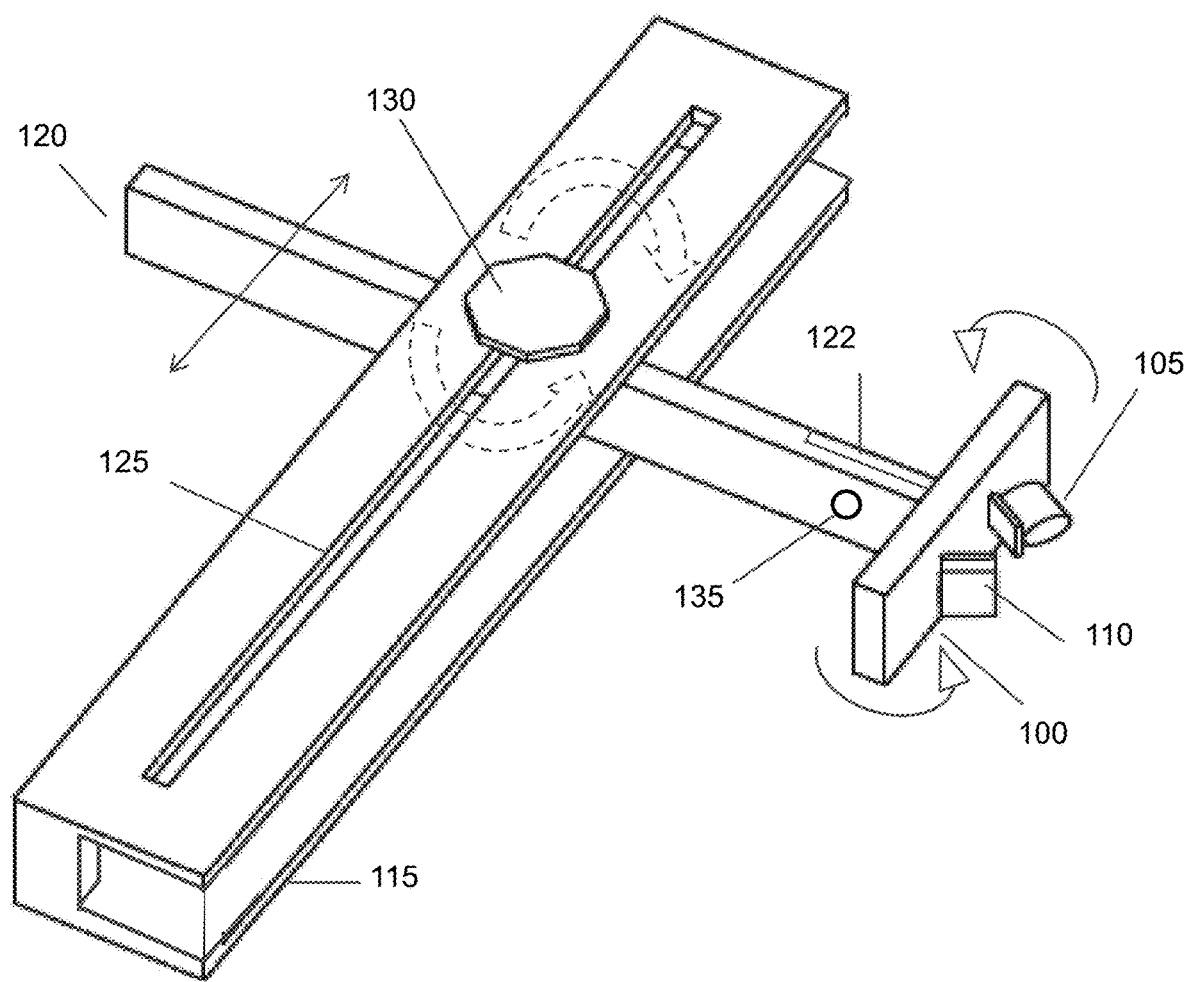
FIG. 1 is an overall assembled view of the embodiment of the invention having transducers, stand and metallic sheet.
Figure 3A:
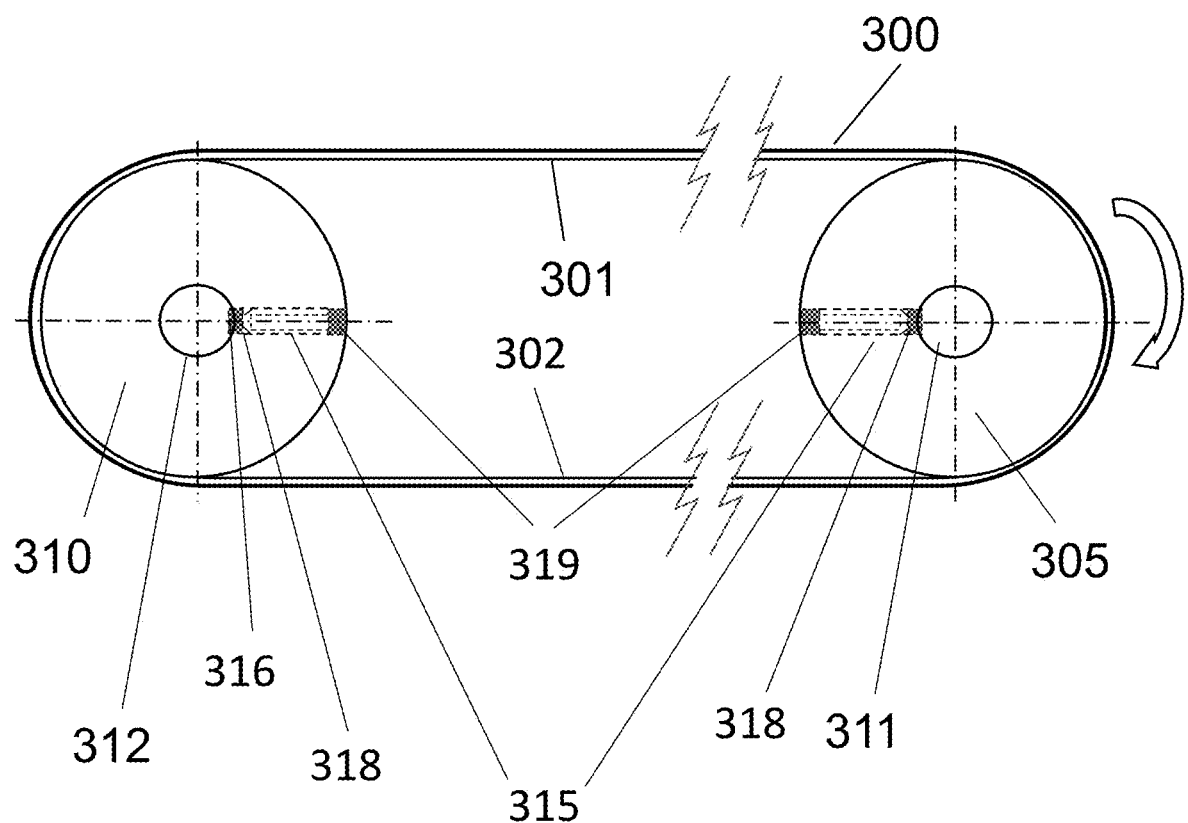
FIG. 3A shows the schematic diagram for belt slip monitoring depicting the locknuts which are used for tightening the pulleys to the drive shaft along with acoustic sleeves mounted on the surfaces of locknuts

In FIG. 1, transmitting transducer 105 and receiving transducer 110 are mounted preferably at an angle of 45 degrees relative to a mounting plate 100, both being mounted on the mounting plate. Those skilled in the art may appreciate that several other angles can be used to enable incidence and reflection of ultrasonic waves for capture of the wave signal. Housing 115 is mounted on the machine or other device in which a belt's tension is to be measured, at a suitable location. Additionally, arm 120 can move linearly inside the housing using a slot 125, and can also be rotated at any angle up to a range of 180 degrees around a pivot 130, to enable the transducer pair to reach close to either the driver pulley 305 or driven pulley 310 (FIG. 3A). The transducer pair can also be made to face in a direction perpendicular to the plane of translation or rotation of arm 120 relative to the housing 115. This can be realized by rotation of the mounting plate 100 around a pivot 135 using a part 122 attached perpendicular to the mounting plate or integral with the mounting plate. Those skilled in the art can appreciate that rotations around the pivots as well as translation of the arm inside the slot may be automated by deploying pneumatic, hydraulic or electric powered means for driving such as cylinders or motors in combination with mechanisms such as bearings, bushes, guideways, ball screws or rack and pinion devices. Such additional but optional implementations of the invention fall within the spirit of this disclosure.

Figure 2:
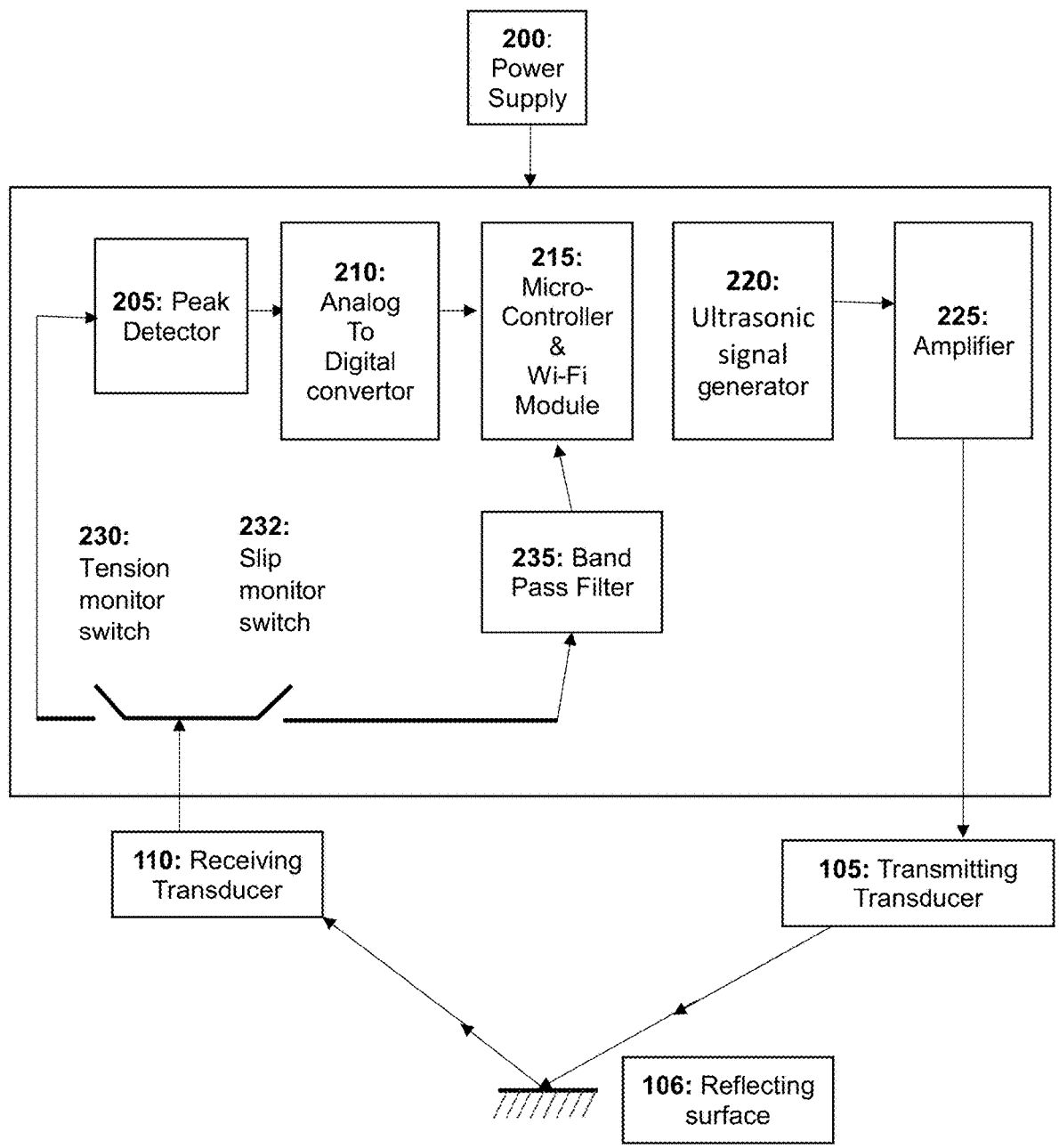
FIG. 2 shows the block diagram depicting the signal path, starting from signal generating, transmitting transducer, reflection from sensed surface, receiving transducer and signal processing circuit.

FIG. 2. depicts the block diagram where 200 is a DC Power supply connected as power source for all electronic components used for the invention. 230 and 232 are switches which are used to select the mode of operation as either tension monitoring or slip monitoring. 220 is an Ultrasonic signal generator which uses electrical signal at suitable frequency for producing ultrasonic waves that get amplified by 225 and emitted by transmitting transducer 105. The ultrasonic waves emitted from 105 are reflected from the belt surface during the belt tension monitoring mode; and from pulley surface and acoustic plug surface during slip monitoring that will be described later in this disclosure. These reflecting surfaces are denoted by 106. The reflected signal is attenuated to different levels and received by the receiving transducer 110. When slip monitoring mode is selected by switch 232, the received signal is transmitted through a Band Pass Filter 235 which filters out signal which do not fall within a predefined bandwidth. When tension monitoring mode is selected by switch 230, the received signal is transmitted directly to peak detector 205, and peak value is measured through Analog to Digital Convertor 210. Peak detector's output signal is compared with threshold value stored in Microcontroller and Wi-Fi Module 215. Warning message is generated when received peak value is less than threshold value by this unit. These messages are transmitted to a cloud platform and/or a computer or a mobile phone using the Wi-Fi network, enabling Internet of Things (IoT) capability in real-time belt tension monitoring.

Figure 2A:
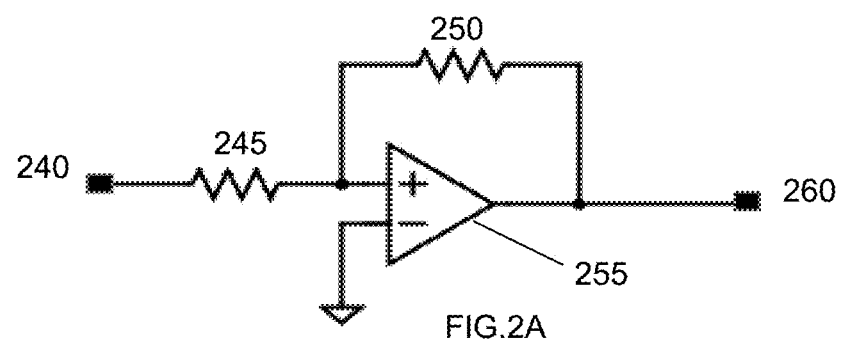
FIG. 2A shows the schematic diagram for the amplifier used in the block diagram (FIG. 2).

FIG. 2A shows the amplifier which amplifies signal at ultrasonic frequency using a high-speed amplifier. 240 represents the input pin of amplifier where the signal from 220 is connected for amplification. 255 represents the operational amplifier with high gain using feedback resistances 245 and 250. The signal amplified is sent to pin 260.

Figure 2B:
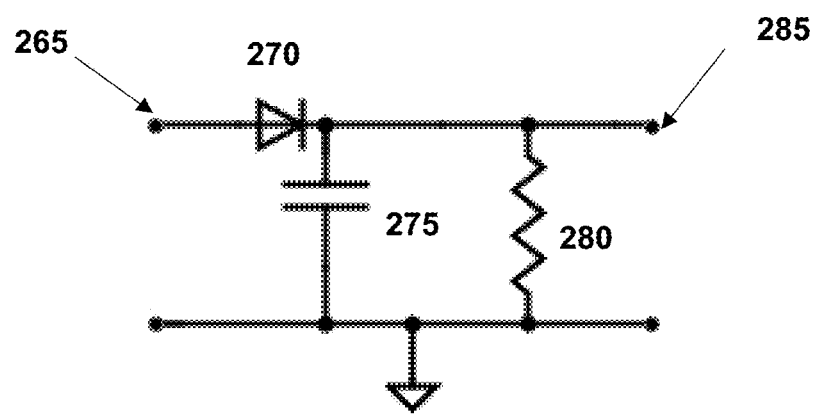
FIG. 2B shows the schematic diagram for the peak detector used in the block diagram (FIG. 2).

FIG. 2B shows the peak detector which is made using a high frequency diode 270, capacitor 275, and resistor 280. Received signal from receiving transducer 110 is fed to input terminal 265 of peak detector when switch 230 is closed for tension monitoring. The peak value of signal is sent to output terminal 285.

Figure 2C:
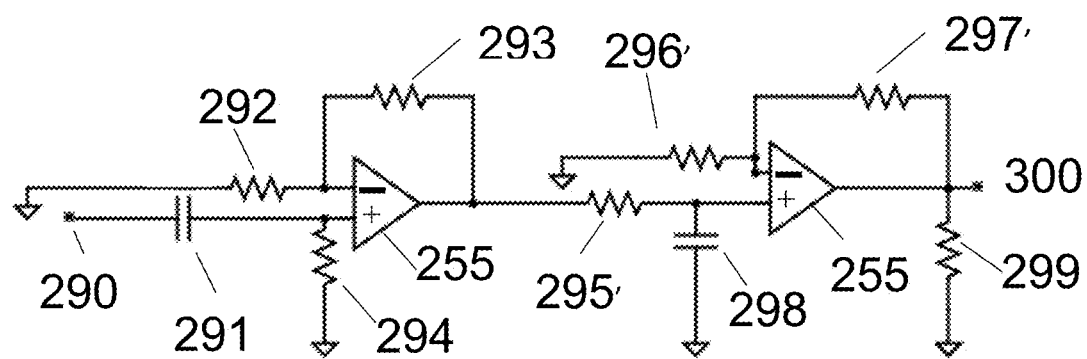
FIG. 2C shows the schematic diagram for the Band Pass Filter used in the block diagram (FIG. 2).

FIG. 2C depicts band pass filter in which two operational amplifiers 255 are used. This received signal for slip monitoring is sent through switch 232 to filter out the signal which is not in the ultrasonic frequency range. The signal within specified ultrasonic frequency band is sent to the output pin 300. Resistors 292, 293, 294, 295, 296, 297 and 299 and Capacitors 291 and 298 are chosen so as to achieve desired passband for the ultrasonic signal.

FIG. 3A depicts the overall layout of the belt drive illustrating the driver pulley, driven pulley, and belt. A belt 300 is mounted on the driver pulley 305 and driven pulley 310 which are fixed respectively to a motor shaft 311 and a load shaft 312 using locking screws 315. These screws typically may be grub screws. The shafts may have a flat milled or grounded surface 316 for secured locking. A brass or Aluminum piece 318 is typically used to avoid damage on the locking surface of shafts. Filler cap 319 acting as an acoustic plug made of a material different from the pulley material is filled and thus embedded on a pulley after fixing lock screw to generate an ultrasonic signal different from that generated by reflection by the pulley material. For example, if the pulley is made of steel or cast iron, there will be reflected ultrasonic signal from the pulley, but as soon as signal absorbing or attenuating filler (such as thermocol filler) plug is come across, there will be no signal reflected. In a preferred embodiment of the invention, the tension and slip monitoring transducers assembled on mounting plate 100 (FIG. 1) are placed so as to allow incidence of ultrasonic waves from transmitter transducer on the inside surface of the belt and reflected waves enter into the receiver transducer. The set of transducers can be placed close to either tension side of the belt 301 or close to the slack side of belt 302 depending on specific requirements of application. By adjusting height of housing 115 (FIG. 1) as fixed on body of the overall structure, this can be realized. Switch 230 (FIG.

2) selects the tension mode of operation and switch 232 selects slip detection. Either of the switches will be closed at any time depending on whether tension or slip is being monitored.

Figure 3B:
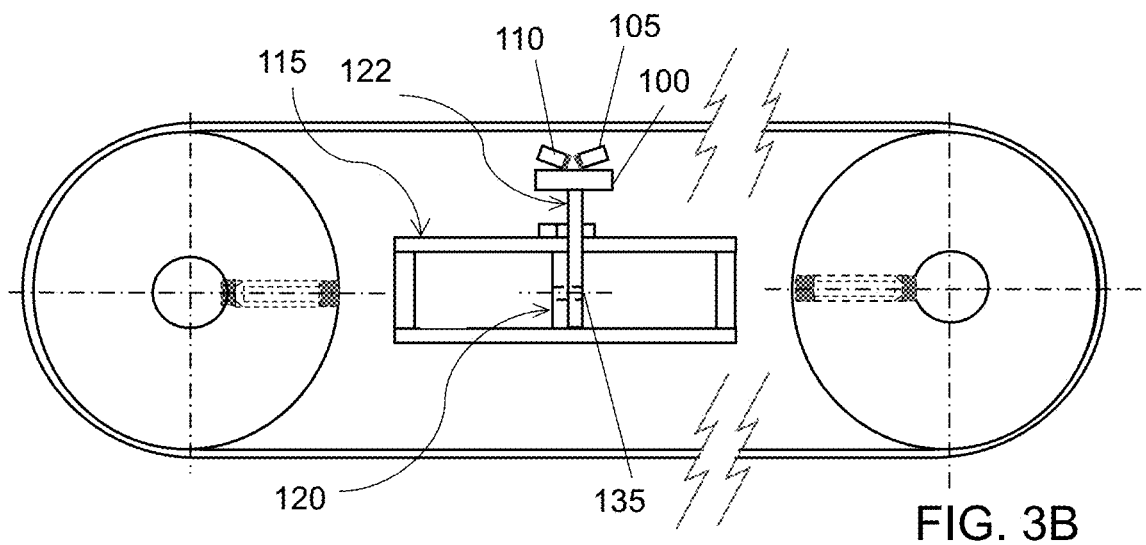
FIG. 3B shows the view of the sensing unit placed between the tension and slack sides of the belt with the sensor mounting arm bent upwards towards the tension side of the belt.

FIG. 3B shows the configuration wherein mounting plate 100 and thus the transducers 105 and 110 face the inner surface of tension side of the belt.

Figure 3C:
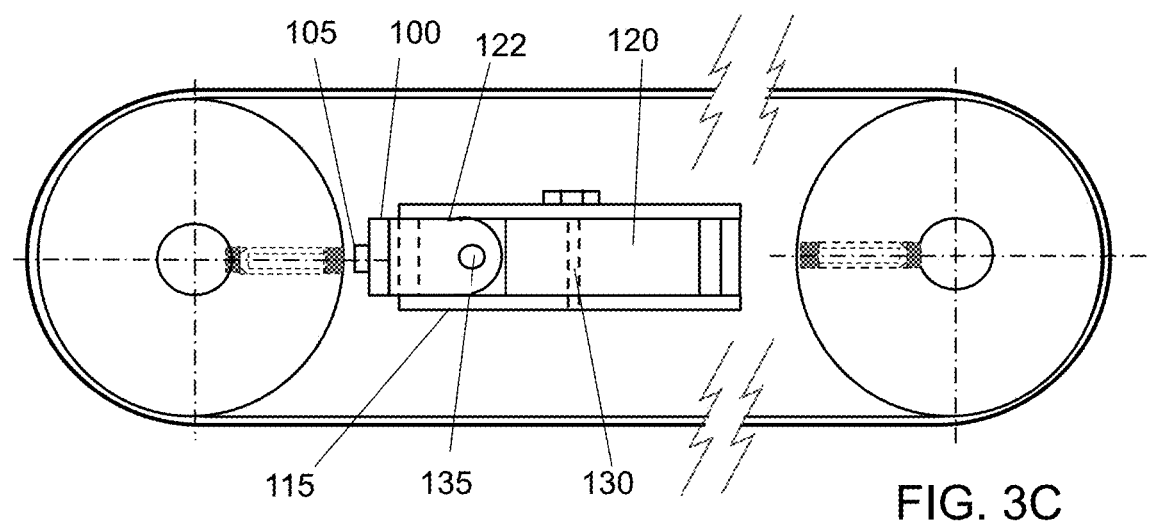
FIG. 3C shows the view of the sensing unit placed between the tension and slack sides of the belt with the sensor mounting arm extended towards the driven pulley.

FIG. 3C shows the configuration wherein mounting plate 100 and thus the transducers 105 and 110 face the surface of driven pulley or acoustic plug associated with the driven pulley.

Figure 3D:
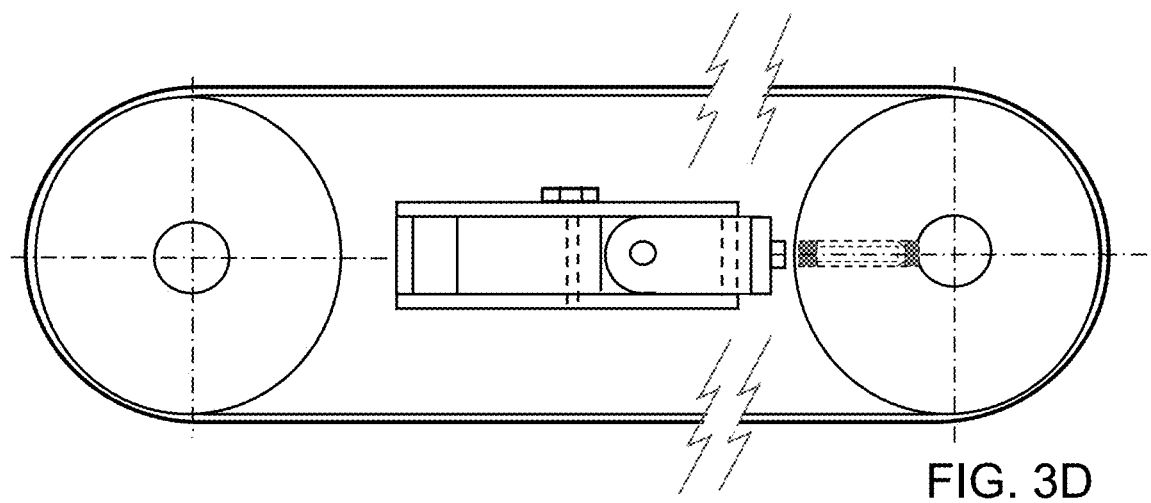
FIG. 3D shows the view of the sensing unit placed between the tension and slack sides of the belt with the sensor mounting arm extended towards the driver pulley.

FIG. 3D shows the configuration wherein mounting plate 100 and thus the transducers 105 and 110 face the surface of driver pulley or acoustic plug associated with the driver pulley.

Figure 3F:
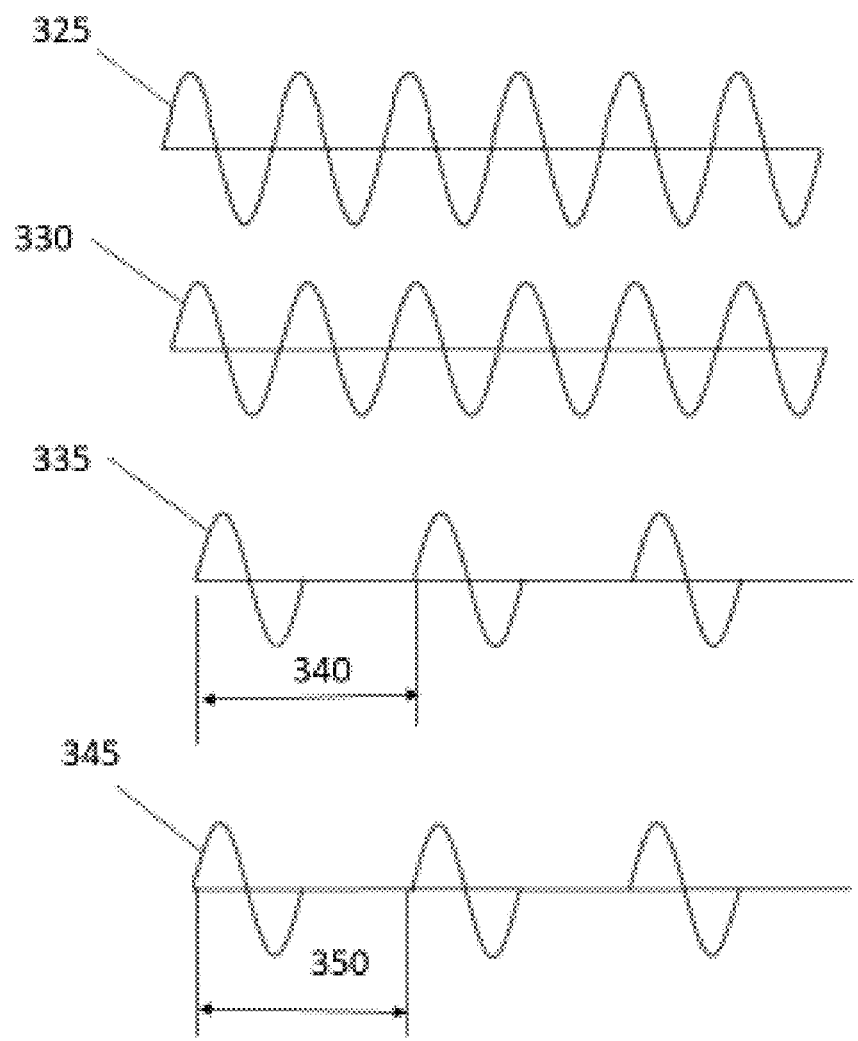
FIG. 3F shows the signal transmitted and reflected from belt during the belt tension and slip monitoring.

Both FIGS. 3C and 3D show the internal view of the locking screw 315 with the acoustic plug 319 mounted on its surface (FIG. 3A). This acoustic plug 319 absorbs the ultrasonic signal or reflects it back at different frequency. This is useful for determining slip of the belt by measuring rotation speeds of the driver and driven pulleys 305 and 310 respectively FIG. 3F shows the various signals used for tension and slip monitoring. Transmitted signal 325 for belt tension monitoring with specified peak voltage and frequency is converted to sound waves by the transmitting transducer 105. The reflected sound signal from belt is received at receiving transducer and converted to electrical signal 330. Peak to peak voltage of received wave 330 is measured using the electronic circuit in FIG. 2B. The amplitude of signal 330 is compared with threshold value stored in the microcontroller and if the received amplitude is lesser than the threshold, an alert message for tension out of range is sent using microcontroller and Wi-Fi Module 215 (FIG. 2).

To measure the slip of the belt, the assembly with mounting plate 100 is tilted towards the driver pulley 305 as shown in FIG. 3D. The ultrasonic signal is transmitted towards the driver pulley 305. The signal 335 (FIG. 3F) reflected from the driver pulley is sent to the Band Pass Filter FIG. 2C which will block the signals reflected due to acoustic plug 319 on locking screw 315 of driver pulley 305. Time period of two consecutive blanking 340 (FIG. 3F) which is due to one complete revolution of driver pulley 305 is computed by the microcontroller.

Similarly, the assembly with mounting plate 100 is tilted towards the driven pulley 310, with acoustic plug mounted on the locking screw 315 as shown in FIG. 3C. The ultrasonic signal is transmitted towards the driver pulley 310. The signal 345 (FIG. 3F) reflected from the driven pulley is sent to the Band Pass Filter (FIG. 2C) which blocks the signal reflected due to acoustic plug 319 on locking screw 315 of driven pulley 310. Time period of two consecutive blanking 350 (FIG. 3F) which is due to one complete revolution of driven pulley 310 is computed by the microcontroller.

Figure 4A:
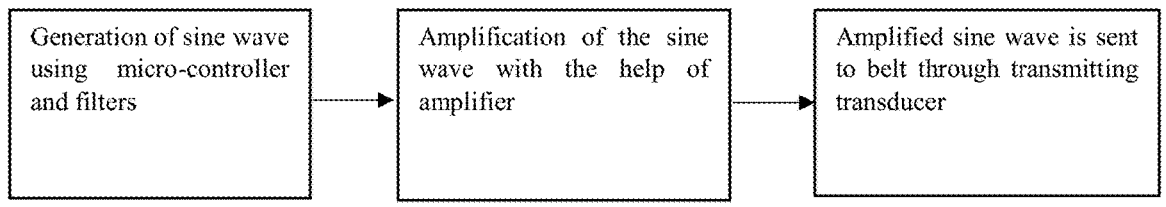
FIG. 4A, FIG. 4B, and FIG. 4C show the sequence of operations for belt tension and slip monitoring system.
Figure 4B:
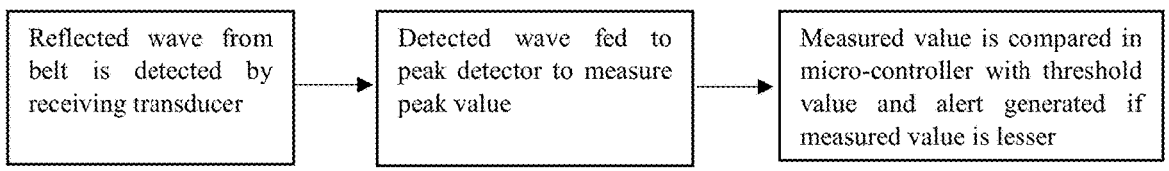

FIG. 4A depicts the process flow for the belt tension monitoring in which ultrasonic signal is amplified and transmitted to the belt. FIG. 4B shows the process flow for the reflected signal from the belt which is sensed by the receiving transducer and sent to peak detector and converted to digital value in microcontroller. The signal is compared with a threshold value in microcontroller and Wi-Fi Module 215 and alarm is generated if peak value of received signal is lesser than that of the threshold value.

Figure 4C:
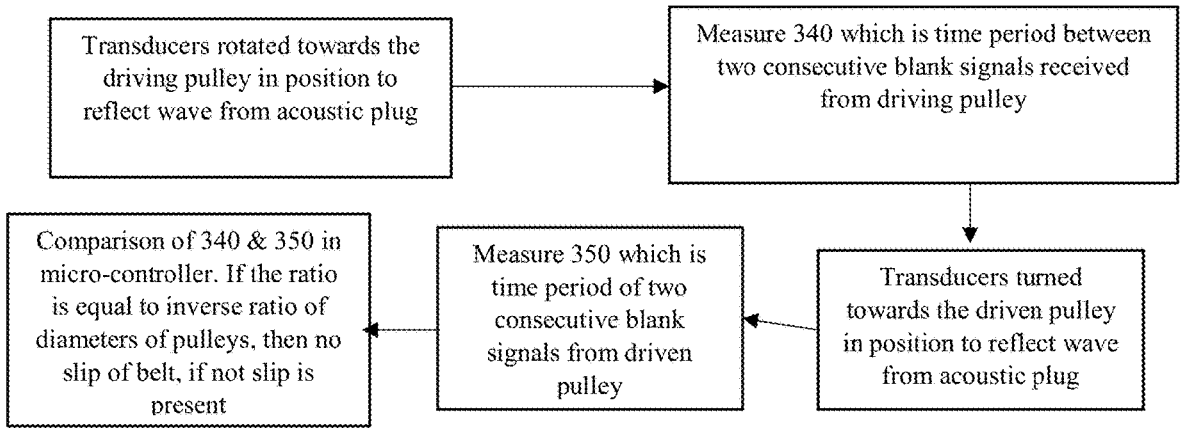

FIG. 4C shows the process flow for measurement of slip of the belt on the drive system. The transducers are rotated to send and receive signal from driver pulley 305 of the belt. Time period 340 which is determined by the two consecutive blank signals reflected from driver pulley 305 is computed by microcontroller and Wi-Fi Module 215. Similarly, again the transducers are rotated to send and receive signal from driven pulley 310. Time period 350 which is determined by the two consecutive blank signals reflected from the driven pulley 310 is calculated. Unit 215 computes the revolutions per minute (rpm) of drive and driven pulleys using the measured time periods 340 and 350. The rotational speeds of the driver and driven pulleys are computed by a program in unit 215. If the rotational speeds of driver and driven pulleys 305 and 310 are equal to the theoretical speeds computed as inversely proportional to pulley diameters, then there is no alert, but if there is a difference in these values, slip is detected and warning message is generated. These messages are transmitted to a cloud platform and/or a computer or a mobile phone or a tablet or any other such interface devices known to those skilled in the art using the Wi-Fi network, enabling Internet of Things (IoT) capability in real-time belt slip monitoring.

We claim:

1. A system for monitoring condition of a belt drive comprising of a means to hold a pair of ultrasonic transducers for transmitting and receiving acoustic signals reflected from either surface of tension side of the belt drive or surface of slack side of belt drive or surface of driver pulley or surface of a signal attenuating acoustic plug embedded on driver pulley or surface of driven pulley or surface of a signal attenuating acoustic plug embedded on driven pulley;
a means to generate, transmit, receive, amplify, process and analyze electrical signals and corresponding acoustic signals to derive information about tension of the belt or slip of the belt with respect to the pulleys or both tension and slip.

2. The system of claim 1, wherein two pivot axes perpendicular to each other and a linear sliding provision is deployed to enable reaching out said plurality of surfaces by a single pair of transducers.

3. The system of claim 1, wherein the acoustic plug embedded on driver pulley or driven pulley is made of thermocol filler.

4. The system of claim 1, wherein switches are provided to select either tension monitoring mode or slip monitoring mode.

5. The system of claim 1, wherein a received signal is transmitted to a peak detector, peak value is measured through analog to digital convertor, peak detector's output signal is compared with threshold value stored in a microcontroller.

6. The system of claim 5, wherein a warning message is generated when received peak value is less than threshold value.

7. The system of claim 6, wherein the warning message is transmitted to a remote location using a Wi-Fi module.

8. The system of claim 7, wherein the remote location has a cloud platform or has a user interface device such as a computer or a mobile phone or a tablet with display to store, retrieve, and view said warning message.

9. The system of claim 1, wherein a signal reflected from a pulley is sent to a band pass filter which blocks the signal reflected due to acoustic plug embedded on a pulley, and time period of two consecutive blankings due to one complete revolution of the pulley is computed by a microcontroller.

10. The system of claim 9, wherein the computation of speeds of rotation of driver pulley and driven pulley and their comparison is used to determine slip of belt relative to the pulleys.

11. The system of claim 10, wherein if a slip is detected, then a warning message is generated.

12. The system of claim 11, wherein the warning message is transmitted to a remote location using a Wi-Fi module.

13. The system of claim 12, wherein the remote location has a cloud platform or has a user interface device such as a computer or a mobile phone with display to store, retrieve, and view said warning message.

14. A method of operation for monitoring condition of a belt drive comprising of steps
   hold a pair of transducers for transmitting and receiving acoustic signals from either surface of tension side of the belt drive or surface of slack side of belt drive;
   hold the pair of transducers for transmitting and receiving acoustic signals reflected from surface of driver pulley or surface of an acoustic plug embedded on driver pulley;
   hold the pair of transducers for transmitting and receiving acoustic signals reflected from surface of driven pulley or surface of an acoustic plug embedded on driven pulley;
   while holding said pair of transducers during said steps, generate, transmit, receive, amplify, process and analyze electrical signals and corresponding acoustic signals to derive information about tension of the belt or slip of the belt with respect to the pulleys or both tension and slip.

15. The method of operation of claim 14, wherein a warning message is generated indicating inadequate belt tension or slip between belt and a pulley or both.

16. The method of operation of claim 15, wherein the warning message is transmitted to a remote location using a Wi-Fi module.

17. The method of operation of claim 16, wherein the transmission to remote location involves transmission to a cloud platform or to a user interface device such as a computer or a mobile phone with display storing, retrieving, and viewing said warning message.

\* \* \* \* \*